United States Patent
Young et al.

(10) Patent No.: US 8,751,661 B1
(45) Date of Patent: Jun. 10, 2014

(54) STICKY ROUTING

(71) Applicant: LinkedIn Corporation, Mountain View, CA (US)

(72) Inventors: Douglas A. Young, Mountain View, CA (US); Swee B. Lim, Cupertino, CA (US); Ganesan Venkatasubramanian, Bangalore (IN)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/085,731

(22) Filed: Nov. 20, 2013

(51) Int. Cl.
 *G06F 15/173* (2006.01)
(52) U.S. Cl.
 USPC .............................. 709/226; 709/203; 709/219
(58) Field of Classification Search
 USPC ......................................... 709/203, 219, 226
 See application file for complete search history.

(56) References Cited

U.S. PATENT DOCUMENTS

| | | | | |
|---|---|---|---|---|
| 8,239,445 B1 * | 8/2012 | Gage et al. | ..................... | 709/203 |
| 8,543,644 B2 * | 9/2013 | Gage et al. | ..................... | 709/203 |
| 2002/0083146 A1 * | 6/2002 | Ferguson et al. | ............. | 709/213 |
| 2002/0143953 A1 * | 10/2002 | Aiken, Jr. | ..................... | 709/227 |
| 2004/0024880 A1 * | 2/2004 | Elving et al. | ..................... | 709/227 |
| 2005/0050202 A1 * | 3/2005 | Aiken et al. | ................... | 709/227 |
| 2013/0007225 A1 * | 1/2013 | Gage et al. | ..................... | 709/219 |
| 2013/0246630 A1 * | 9/2013 | Exton et al. | ................... | 709/227 |

* cited by examiner

*Primary Examiner* — Thomas Dailey
(74) *Attorney, Agent, or Firm* — Park, Vaughan, Fleming & Dowler LLP

(57) ABSTRACT

A system and method are provided for sticky routing of a user's service requests and connections to a distributed service hosted by multiple data centers. Sticky routing data are generated when a user first connects, to include member ID, preferred data center, a user bucket associated with one data center, a generation of the bucket, a generation of the user's sticky routing data, and timing information identifying a time of issue and/or a time of expiration of the routing data. A user bucket is either online (accepts new users; their requests are routed to the associated data center), offline (not accepting new users; existing users are expelled and must join a different bucket), or closed (not accepting new users; existing users' requests continue to be routed to the associated data center). All of a user's requests, from all devices, are thus routed to one data center, based on member ID.

20 Claims, 4 Drawing Sheets

STICKY ROUTING

BACKGROUND

This invention relates to the field of computer systems. More particularly, a system and methods are provided for associating individual computer system users with specific data centers via sticky routing.

Many online services are supported by multiple operations centers, each one encompassing the hardware and software resources necessary to support the service. Typically, each user connection or request submitted to such a service is routed to an operations center chosen because it is the closest to the user (or the entity routing the request), because it is the least congested, because doing so will help distribute the service's load, or because it satisfies some other criteria.

However, this means that sequential service requests from one user device, or requests from different devices operated by the same user, may be routed to different sites. For example, if the user changes a particular data value during a connection with a first operations center, and a subsequent request regarding that data is routed to a second, different, operations center (e.g., to view the updated data), the data displayed by the second data center may not reflect the change. This may affect the user's experience and/or confidence in the service.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the invention associated with this disclosure is not intended to be limited to the embodiments shown, but rather is to be accorded the widest scope consistent with the disclosure.

In some embodiments of the invention, a system and methods are provided for "sticky routing" of user connections and requests to an online service that features or is hosted by multiple data centers. In these embodiments, sticky routing causes all service connections from a given user, from all devices operated by that user, to be routed to a single data center. One illustrative benefit of sticky routing is that all data modifications the user may submit are applied to one repository, thereby eliminating the problem of different versions of data being served within different connections terminated at different data centers.

Figure 1:
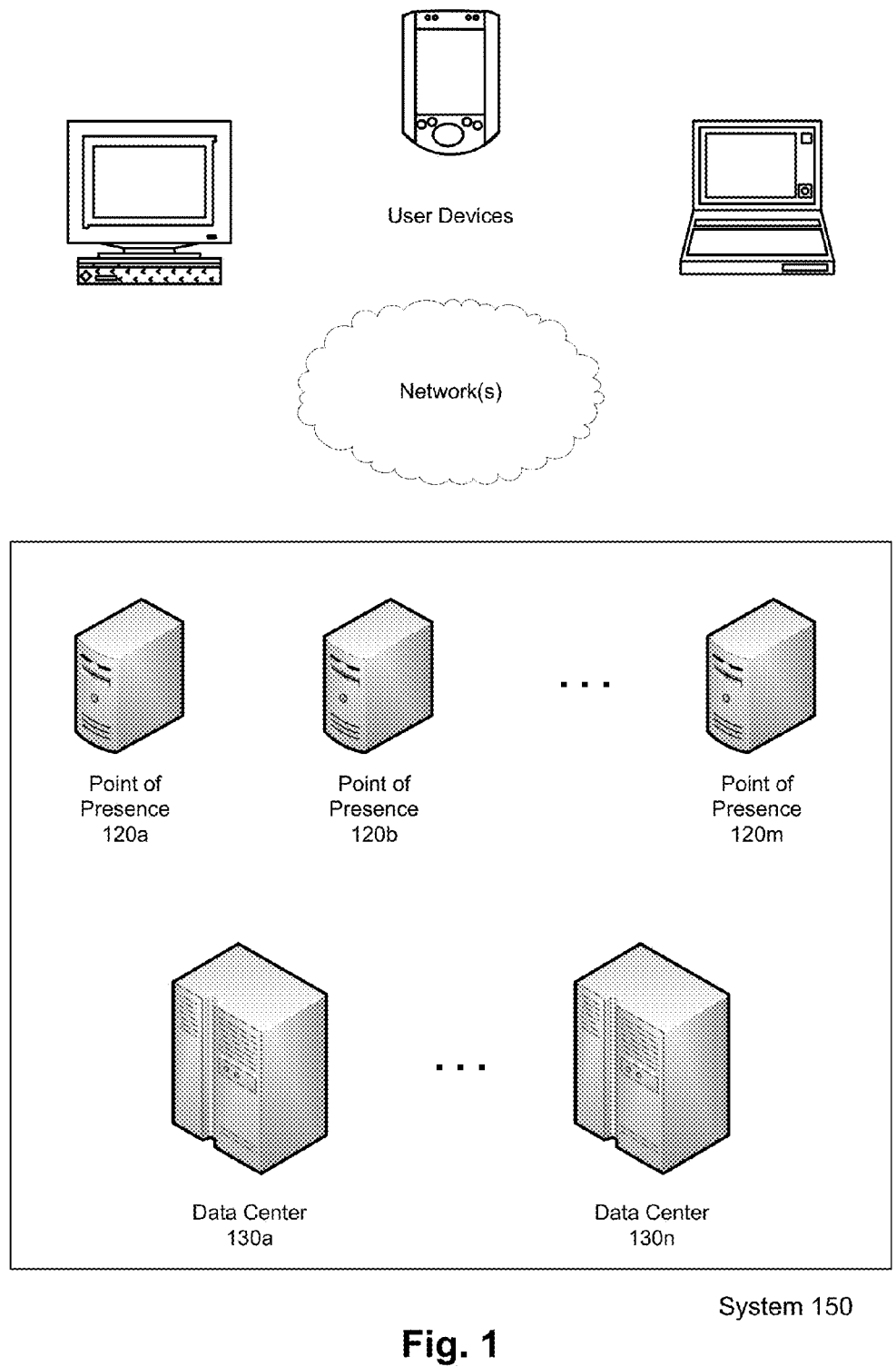
FIG. 1 is a block diagram of a system that hosts a distributed computing service featuring multiple data centers, in accordance with some embodiments.

FIG. 1 is a block diagram of a system that hosts a distributed computing service featuring multiple data centers, according to some embodiments. In these embodiments, distributed system 150 features multiple data centers 130 (e.g., data centers 130a through 130n) and multiple points of presence 120 (e.g., points of presence 120a through 120m). As discussed further below, a data center 130 includes hardware and software resources for hosting the distributed service. Points of presence 120 may be switches, routers, computer servers or other devices capable of relaying user connections and service requests to the data centers. Data centers 130 and points of presence 120 are coupled via any number and types of communication links, which may include wired and/or wireless links, local area networks, wide area networks, metropolitan area networks, the Internet, etc.

Users operating various types of user devices (e.g., stationary computers, portable computers, smart phones) connect to system 150 through one or more networks (e.g., the Internet), which route the users' connections to a point of presence 120 that, in turn, routes the users' service requests to a data center 130. For example, one or more IP (Internet Protocol) addresses associated with a service hosted by system 150 may be shared among points of presence 120, and a DNS (Domain Name Service) server may route a given user to any of the points of presence.

In some specific embodiments, system 150 hosts a professional social networking service or site that enables users to create, develop and maintain professional (and personal) relationships. As part of the service, system 150 serves content for presentation to users via their user devices, which may include content generated or suggested by other users (e.g., text, images, video, audio), messages between users, offers from members and/or non-members, advertisements, announcements, job listings, status updates, and so on. In some implementations, the professional social networking service is LinkedIn®.

Points of presence 120 and data centers 130 are geographically dispersed. Whereas users' connections to points of presence 120 may be determined by entities not part of system 150 (e.g., routers, DNS servers, ISP (Internet Service Provider)), once a user connection reaches a point of presence, a version of sticky routing described herein is applied to ensure all connections by that user are routed to the same data center.

In some embodiments of the invention, each user of system 150 (e.g., each member of a service hosted by the system) is allocated to one of data centers 130a-130n, based on factors such as their patterns of use of the system, the system/service features accessed by the user, etc. For example, system 150 may monitor users' connections and, in order to determine which data center a given user should be associated with, may identify the geographic location or locations from which or through which the user accesses system 150. Those locations may be gleaned from network addresses (e.g., IP addresses) of the devices operated by the user, from addresses of intermediate devices (e.g., routers, switches, ISPs) that route the user to system 150, by from specific information provided by the user (e.g., his or her residential address as specified as part of a user profile), or in some other way.

Figure 2:
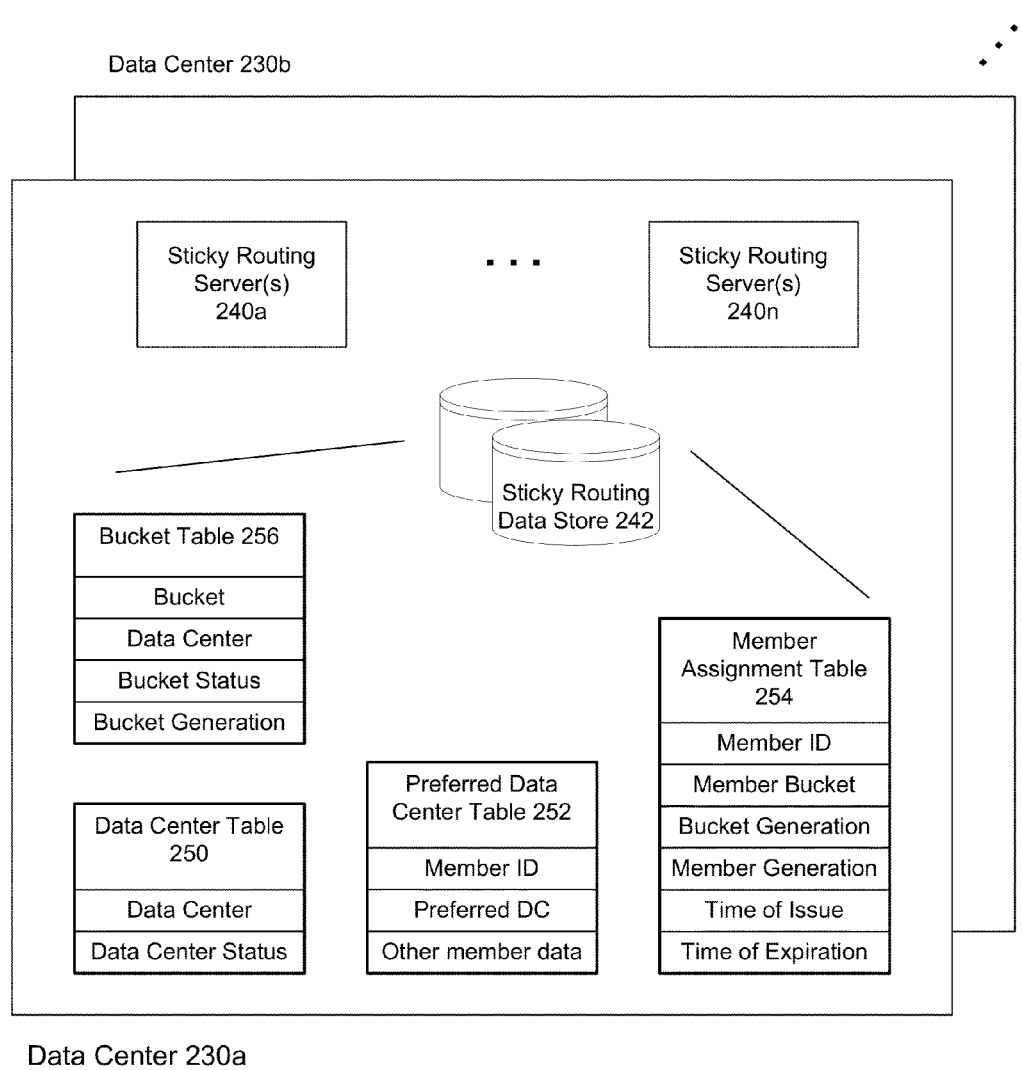
FIG. 2 is a block diagram of a data center, in accordance with some embodiments.

FIG. 2 is a block diagram of a data center according to some embodiments. Each data center supporting the same distributed service and providing sticky routing may be configured identically or similarly to data center 230a, or may differ to some degree, but all data centers support member connections to the common application or service hosted by the data centers.

Data center 230a includes sticky routing server (SRS) 240 and one or more sticky routing data stores 242. Illustratively, each SRS may comprise separate hardware (e.g., a separate computer server), or one or more sticky routing servers may operate as software modules executing on one computer server (e.g., Java Server processes executing within virtual machines). Data center 230a may also include a router, switch or other entity for routing or distributing requests among the sticky routing servers.

Sticky routing servers may operate in some or all data centers 230 of a distributed service. In some embodiments in which multiple SRS operate, one of the sticky routing servers is a master, and only that master can take some actions (e.g., assign members to buckets, change the status of a data center or bucket).

Sticky routing server 240 is responsible for determining a member's preferred data center, which is where his or her connections and service requests will usually be routed. Thus, when a member connects to a point of presence or other intermediate entity, a sticky routing server of a data center will usually be queried to determine where to direct the member connection. If the member (or client software operated by the member) was previously provided a cookie or other tag associated with the service, that tag may indicate where to route the member (if the tag is still valid).

To help determine where to route a member connection or request, and to enable effective management of members (e.g., to distribute them among multiple data centers), SRS 240 uses sticky routing data stored in data store(s) 242, which may be configured in different ways in different embodiments. Sticky routing data is replicated among the distributed service's multiple data centers, so that any SRS can response to any routing request or query.

In some embodiments, data store 242 includes multiple tables that allow an SRS to quickly retrieve the information it needs to tell a point of presence (or other entity) where to route a member connection. In other embodiments, sticky routing data may be organized in other ways.

Within data store 242 of data center 230a, Data Center Table 250 identifies every data center that is part of the distributed system or service, and reflects its current status (e.g., online, offline). Preferred Data Center Table 252 may be implemented to map every member ID to the corresponding member's preferred data center, and may include other member data (e.g., the member's time zone, one or more device tokens associated with the member's devices, a secondary or backup preferred data center).

Member Assignment Table 254 includes, but is not limited to, member ID (assigned by the service or application), member bucket, bucket generation, member generation, and the time of issue (and possibly the time of expiration) of the member's routing data (and/or cookie, if the member has been issued one). The time values for a member's routing data help the system synchronize multiple cookies that may be issued to the member for different devices (e.g., desktop computer, portable computer, smart phone). A member's routing data may periodically expire whether or not it is not memorialized in a cookie.

In embodiments reflected in FIG. 2, members are grouped into buckets or other logical collections. Each online data center 230 has some number of buckets associated with it (i.e., one or more). Although a given member's bucket will usually be associated with the data center identified as the member's preferred data center, this will not always be the case.

The more buckets that belong to or that are associated with a data center, the fewer members in each one. For a data center having 100 buckets, each bucket contains approximately 1% of all members of the distributed service that are assigned to that data center. For a data center with only 50 buckets, each bucket encompasses approximately 2% of its share of members. For a data center having 1,000 buckets, each would encompass approximately 0.1% of its share of members.

Members may be assigned to or distributed among buckets of a given data center randomly, by hashing the member ID or other identifier, in round-robin fashion, or in some other way.

By dividing members into multiple buckets, member traffic can be directed toward or away from a given data center in a flexible manner. For example, if a given data center is to be taken offline, instead of simultaneously shifting all members currently using that data center to a different data center—which could significantly degrade another data center's operations (especially if there is only one other data center available)—members could be shifted or redirected gradually (e.g., one bucket at a time) by emptying one bucket at a time and assigning those members to a bucket of a different data center.

In some implementations, each data center bucket is in one of three states—online, offline or closed. An online bucket can receive new members, and those members' connections and queries are directed to the bucket's corresponding data center. A closed bucket may or may not contain any members, but it does not accept new members; existing members in the bucket can continue connecting to the associated data center until their routing data (e.g., cookies) expire, at which time they will be assigned to different buckets.

An offline bucket does not receive new members and, when a bucket is marked offline, members currently assigned to the bucket can no longer connect to the corresponding data center and will be assigned to different buckets the next time they connect to the system. Illustratively, the expiration date of their data may be advanced so that it expires immediately.

In some embodiments, instead of having separate collections of buckets for each data center, the system maintains a single set of buckets; each bucket is assigned to one data center at a time, but can be re-assigned as necessary. In these embodiments, when a data center is to be taken offline or if traffic to that data center must be decreased for some other reason, individual buckets assigned to that data center can be re-assigned to different data centers.

Member bucket statuses are reflected in Bucket Table 256, which identifies every member bucket, the data center the bucket belongs to, the bucket's status (i.e., online, offline, closed), and the bucket's current generation number. The generation number may change (e.g., increment) every time the bucket's status changes.

Returning to Member Assignment Table 254, the bucket generation field identifies the generation of the bucket to which a member is assigned. Each time a bucket changes state, its generation is updated (e.g., incremented by one). When a bucket generation value changes, points of presence may be notified so that they do not honor any cookies that reference a previous generation of the bucket. Instead, a point of presence that receives a cookie having an obsolete bucket generation will simply query a sticky routing server to obtain updated routing data for the member.

The member generation value identifies the generation of the member's sticky routing data. Each time a significant component of the data changes (e.g., member bucket, bucket generation, preferred data center), the member generation value is updated (e.g., incremented by 1) and the member's existing sticky routing data (e.g., and cookie, if assigned) may be rendered invalid. In some embodiments, a member generation value changes only when a member is placed into a different bucket, or only when the member is placed into a bucket of a different data center. Because some or all of a member's sticky routing data may be saved when application data for that member is cached within a data center (i.e., as part of a cache key), a change in the member generation value will serve to invalidate stale application data and prevent it from being served to the member.

For example, a member using the distributed service may be currently connected to data center 230*a*. During her usage of the service she may update an attribute in her profile, submit a query, or otherwise generate data that are cached by that data center. While that data is cached for her in data center 230*a*, she may be re-assigned to a different data center, such as data center 230*b*. Illustratively, the service may have taken her bucket offline to reduce traffic to data center 230*a* (or because data center 230*a* is going offline), but without changing her preferred data center. Now her connections, service requests, queries and so on are directed to data center 230*b* vice data center 230*a*.

Assume further that she continues updating her profile and/or changing other data. These updates are dutifully recorded in the application data store(s) associated with the service (not depicted in FIG. 2), and queued for replication to other data centers (including data center 230*a*). However, if she is re-assigned to data center 230*a* (e.g., because her bucket at data center 230*b* is taken offline) and is served data that she had changed at data center 230*b*, but which had been cached at data center 230*a*, she may receive an old version that does not reflect her updates.

By updating her member generation value each time a significant element of her sticky routing data changes, the key for her cached data changes and will not match obsolete data. Therefore, in this example, when she was returned to data center 230*a*, the previously cached data would now be recognized as obsolete, and the service will retrieve fresh data that reflects the changes she made at data center 230*b*. A change to a member bucket generation value or a user generation value may cause the corresponding member's sticky routing data to immediately expire (thereby requiring points of presence to obtain new routing data the next time they receive a service request from the member).

Other data may be stored within data store(s) 242, and may or may not be considered part of the sticky routing data used to ensure that all connections and service requests from a single user are routed to the same data center. Such data may include tracking information (e.g., to track her service connections and requests), histories of usage of the service, data reflecting performance of sticky routing, etc. In other embodiments, other data structures and collections may be employed to store sticky routing data, different from those depicted in FIG. 2 and described above.

In some embodiments, a REST (Representational State Transfer) architecture is employed by sticky router servers 240 to manage sticky routing data on data store(s) 242. REST is a stateless, cacheable communications protocol in which HTTP (HyperText Transport Protocol) requests may be used for all data operations (i.e., create, read, update, delete).

When traffic to a data center must be decreased, traffic may be diminished gradually or quickly. To decrease traffic rapidly, all member buckets of that data center are immediately marked offline, and points of presence stop routing any traffic to that data center, but may still query sticky routing data. Traffic involving members assigned to other data centers will continue unaffected, but connections, queries and other service communications from members assigned to the affected data center (which may be determined from the members' cookies or by query to an SRS) will be recognized as invalid. For these members, the points of presence will query a sticky routing server to obtain new routing data, which will cause the sticky routing server to assign the member to a different bucket that is online.

To decrease traffic gradually, all (or some) buckets associated with the data center are transitioned to the closed state to prevent additional members from being assigned to those buckets. Connections, queries and other communications of members assigned to a closed bucket will still be routed to the data center normally. Over time, the existing members will be transitioned to other buckets. For example, their cookies will expire and/or their bucket generation values will change, and the points of presence will therefore request new routing data for such a member; the responding sticky routing server will re-assign the member to a bucket that is online (and preferably associated with his or her preferred data center). Alternatively, after some or all of a data centers bucket are closed, groups of them may be taken offline to expedite the process of reassigning its members to other (online) buckets.

When a new (or previously offline) data center is brought online, members will gradually be assigned to its buckets (e.g., as their routing data expires). Some or all members' preferred data centers may be recomputed, and/or generations of one or more buckets of one or more other data centers may be incremented (which will cause their members' routing data to be invalid), to drive more members toward the new data center. In some embodiments, one or more buckets of another data center may be re-mapped to the new data center, not only to bring more traffic to the new data center, but to decrease the load on the other data center.

To support sticky routing, various data are cached or otherwise retained at the service's points of presence. For example, the points of presence may be kept apprised of data center statuses (e.g., online, offline), member bucket statuses (e.g., online, offline, closed), may be informed of the current generation of each bucket, etc. Thus, in addition to querying an SRS when a newly connected member's cookie has expired, in order to obtain new or updated sticky routing data, the points of presence may have the intelligence to identify other circumstances in which new routing data are required.

If a member is temporarily reassigned away from his preferred data center, he will eventually be returned (or his preferred data center may change). For example, every time a point of presence determines that such a member's current routing data (e.g., as encapsulated in a cookie) indicates that his connection is to be routed to a data center that his not his preferred data center, it may determine whether any buckets associated with the preferred data center are online; if so, it may request new/updated routing data and a sticky routing server will reassign him. Also, however, in embodiments in which a member's routing data (or cookie) expires at regular intervals, a point of presence will have to refer to a sticky routing server, which will automatically reassign members to their preferred data centers if possible.

In some embodiments, some members or user devices cannot or will not accept cookies (e.g., some smart phones), and/or identify themselves by some mechanism other than member ID. In these embodiments, a member or member's device may be identified by a token (e.g., an OAuth token) provided by the device. Sticky routing servers and/or other components of the distributed system (e.g., points of presence) may maintain mappings between such tokens and the members' IDs, or may query an SRS to identify the member ID with which a token is associated. In some implementations, a separate data table may be maintained to map tokens to member IDs. The tokens may be assigned by the distributed service, by a service provider that supports the device, or by some other entity.

Some components of the online service that reside in data center 230 but are not involved in sticky routing are omitted from FIG. 2. In particular, in illustrative embodiments in which the distributed system provides a professional social networking service, a data center may include various hardware and/or software components for supporting service operations. These components may include a profile server and profile database for configuring and maintaining member profiles, a web server or application server for receiving and handling member connections and requests, a content server and content store for serving content to members, a tracking server and a tracking database for tracking member activity regarding the content they are served, etc.

Figure 3:
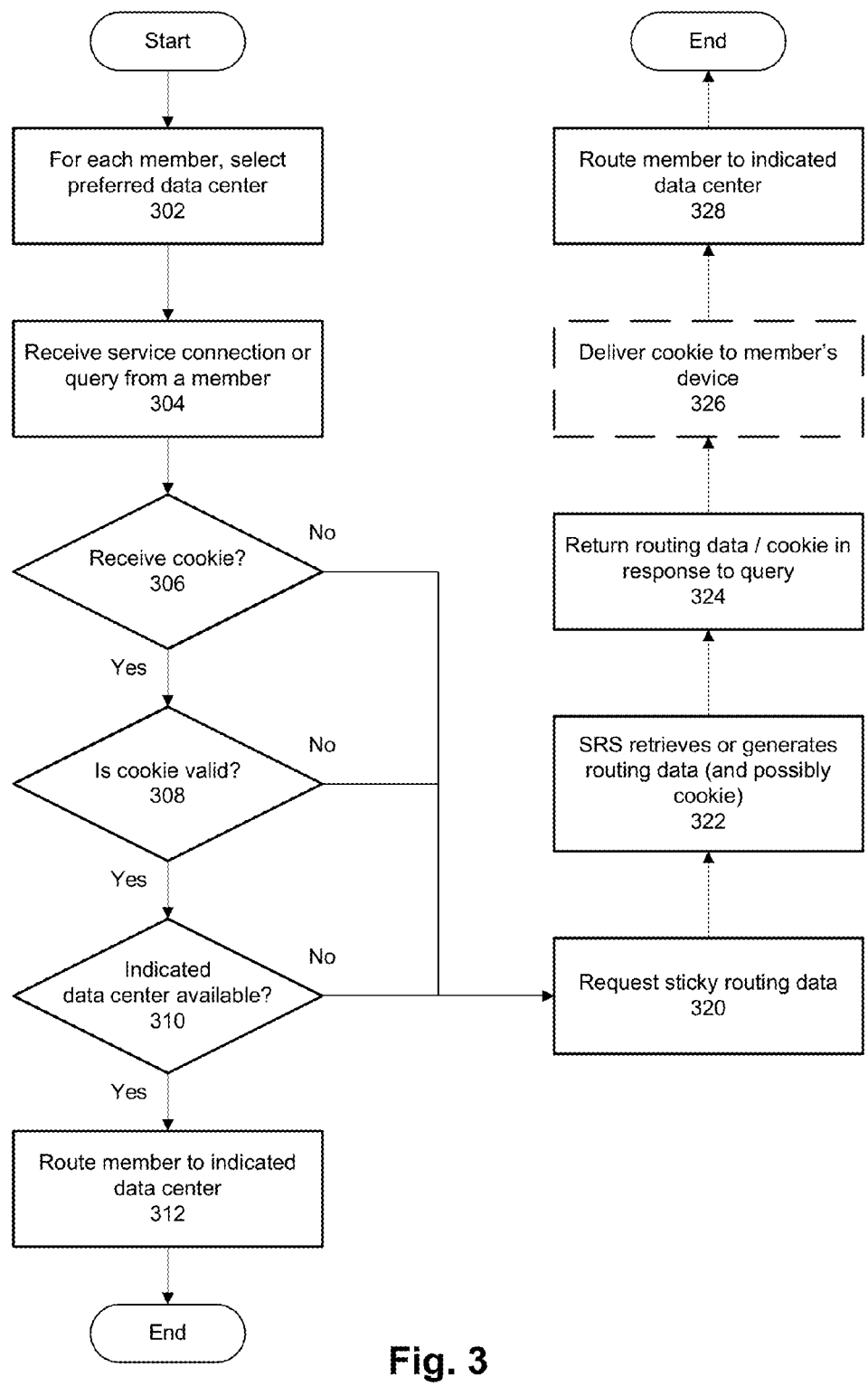
FIG. 3 is a flow chart illustrating a method of sticky routing, in accordance with some embodiments.

FIG. 3 is a flow chart demonstrating a method of sticky routing, according to some embodiments. In these embodiments, a system such as system 150 of FIG. 1 is operated to provide a distributed service, such as professional social networking. Other embodiments may be readily derived from the following description, as will apparent to one of ordinary skill in the art.

In operation 302, preferred data centers are identified for some or all members of the service. In particular, within a data repository used by the service's sticky routing servers, each member's identity or identifier (e.g., member ID) is associated with one preferred data center. Sticky routing data is continually replicated among the service's multiple data centers.

Illustratively, the preferred data center selected for a member is the one that is geographically closest to the member, which may be determined based on information provided by the member and/or examining a pattern of electronic communications exchanged between the service and devices operated by the member. For example, if a given member's connections to the service are usually received at a point of presence located in the Washington, D.C. metropolitan area, it may be assumed that the member is usually closer to a data center located in Virginia than a data center located in California, and the Virginia data center would be selected as his preferred data center. A member's preferred data center may be determined offline or may be determined online (e.g., when the member connects to the service).

In operation 304, a point of presence (e.g., a portal, a switch, an application server, a load balancer, a web server) receives a service connection or query from a device operated by a member, which may be initiated by a browser or other client application that operates on the device and that is compatible with the service. Illustratively, the connection provides a member ID and possibly other information (e.g., a password, a target page of the service, a cookie previously delivered to the user device).

In some embodiments, points of presence that serve (e.g., route traffic to) the service's data centers are regularly informed of (or retrieve) statuses of the data centers (e.g., online, offline) and member buckets (e.g., online, offline, closed, current bucket generation).

In operation 306, the point of presence determines whether a cookie was provided with the connection request or query. If so, the method continues at operation 308; otherwise, it advances to operation 320.

In operation 308, the point of presence determines whether the cookie is valid. This may entail examining contents of the cookie, which may include a time of issue and/or a time of expiration. If no expiration time is provided, a default expiration time (e.g., 24 hours after time of issue) may be applied. Other than time-based expiration, a cookie may be deemed invalid if the bucket identified by the cookie is offline, the bucket generation is obsolete (e.g., less than the current generation), or a cookie generation is invalid. If the cookie is invalid, the method advances to operation 320; otherwise, the method continues at operation 310.

In operation 310, other cookie data are examined, such as the member's assigned bucket, which is tied to one of the service's data centers. In particular, the point of presence identifies the member's bucket from the cookie, and determines whether the associated data center is available (e.g., by referencing a routing table or a cache, by querying a sticky routing server). If the associated data center is available, the method continues with operation 312; otherwise, the method advances to operation 320.

In operation 312, the point of presence forwards the member connection or query to the specified data center. The method then ends.

In operation 320, the point of presence queries a sticky routing server to request sticky routing data and determine where the member's connection should be routed. The query to the SRS may include the member's ID and/or other information (e.g., IP address, device identifier, device token, cookie), if received with the connection or service request. The query may be sent to a default SRS, the closest SRS, or any other sticky routing server within the system.

In some embodiments, a point of presence merely needs to submit a member ID (or a device token received in place of a member ID) to an SRS, and the SRS can respond with a full set of sticky routing data, or just the data that the point of presence currently needs (e.g., a member bucket and/or destination data center) in order to route the member's service request. If, however, the member ID is not (yet) available, the SRS will forward the member connection to a login server or application server where the member will be authenticated and his or her member ID obtained.

In operation 322, the sticky routing server retrieves or generates sticky routing data for the member, as necessary.

Illustratively, upon receipt of the member ID (e.g., from a point of presence, from a login server) the SRS may query a data store (e.g., a Member Assignment Table) to determine if the data store currently has a valid set of sticky routing data for the member. If so, that data can be retrieved, and some or all of it returned to the point of presence. The data may be returned with, or as, a cookie, which the point of presence will deliver to the member's device, or the point of presence may use the sticky routing data to generate a cookie to deliver to the member. In some implementations, the time of issue of the member's routing data may be updated to the present time (the expiration time may or may not change).

If the data store does not have a current, valid set of sticky routing data for the member (e.g., no current bucket assignment), the SRS will generate it. Illustratively, this may be the member's first connection to the service, a previous set of routing data may have expired or become invalid, the member's currently assigned bucket (in the Member Assignment Table) may be offline, the member's preferred data center may have changed since his or her last connection, or new routing data may need to be generated for some other reason.

To generate a new or updated set of sticky routing data, the sticky routing server first uses the member's member ID to retrieve his or her preferred data center (e.g., from a Preferred Data Center Table), and then determines whether that data center is available (e.g., via a Data Center Table). If the member's preferred data center is unavailable, the system may either select a new preferred data center, or may select a temporary data center that is online. The SRS then assigns the member to one of the selected data center's buckets (e.g., randomly, according to some scheduling or queuing scheme)—but only to a bucket that is online (e.g., determined using a Bucket Table). If there are no online buckets for the selected data center, a different data center is selected.

The SRS populates the sticky routing data store (e.g., a Member Assignment Table) with the member's new sticky routing data, which may include the member's ID, bucket, current bucket generation, current member generation, a time of creation of the routing data, and possibly an expiration time.

In operation 324, the sticky routing server responds to the point of presence's query by providing some or all of the member's sticky routing data and/or a cookie to deliver to the member's device. In some embodiments, just the necessary routing data is returned (e.g., current bucket, user generation, issue timestamp) and the point of presence generates a cookie to deliver to the device.

In optional operation 326, a cookie is provided to the member's device, to be returned with the next connection request or query. In embodiments in which the device cannot accept cookies, a member-specific token may instead be delivered to and stored on the device. The use of cookies is optional in the illustrated embodiment, because a point of presence could simply query a sticky routing server or some other system component (e.g., a router, a cache) to obtain the necessary routing information when needed (e.g., every time a member connects or submits a query or request).

In operation 328, the member's connection or query is routed to the specified data center (i.e., the data center associated with the member's current bucket), assuming that data center is still available.

If a member uses multiple different devices to connect to the service, the same sticky routing data may be used for each connection, thereby ensuring that the user primarily interacts with a single data center and his or her service data will always immediately reflect his or her changes. For example, a first cookie may be generated and delivered to a first device used by the member during a first connection. That cookie, or at least the routing data embodied in the cookie, is saved at the sticky routing servers and/or points of presence. When the member later connects with a second device, the same (or a similar) cookie will be delivered to that device. Thus, the member's cookies are based on his or her member ID and not, for example, on a device identifier, thereby allowing all of that users' connections and requests to be handled in the same way (i.e., routed to the same data center).

In embodiments of the invention in which cookies are provided to members' devices, the cookies will have expirations and have to be regenerated from time to time. This ensures that if a member's sticky routing data changes (e.g., he or she has moved and should now have a different preferred data center), the devices' cookies will be updated accordingly within a reasonable timeframe (e.g., 12 hours, 1 day).

Figure 4:
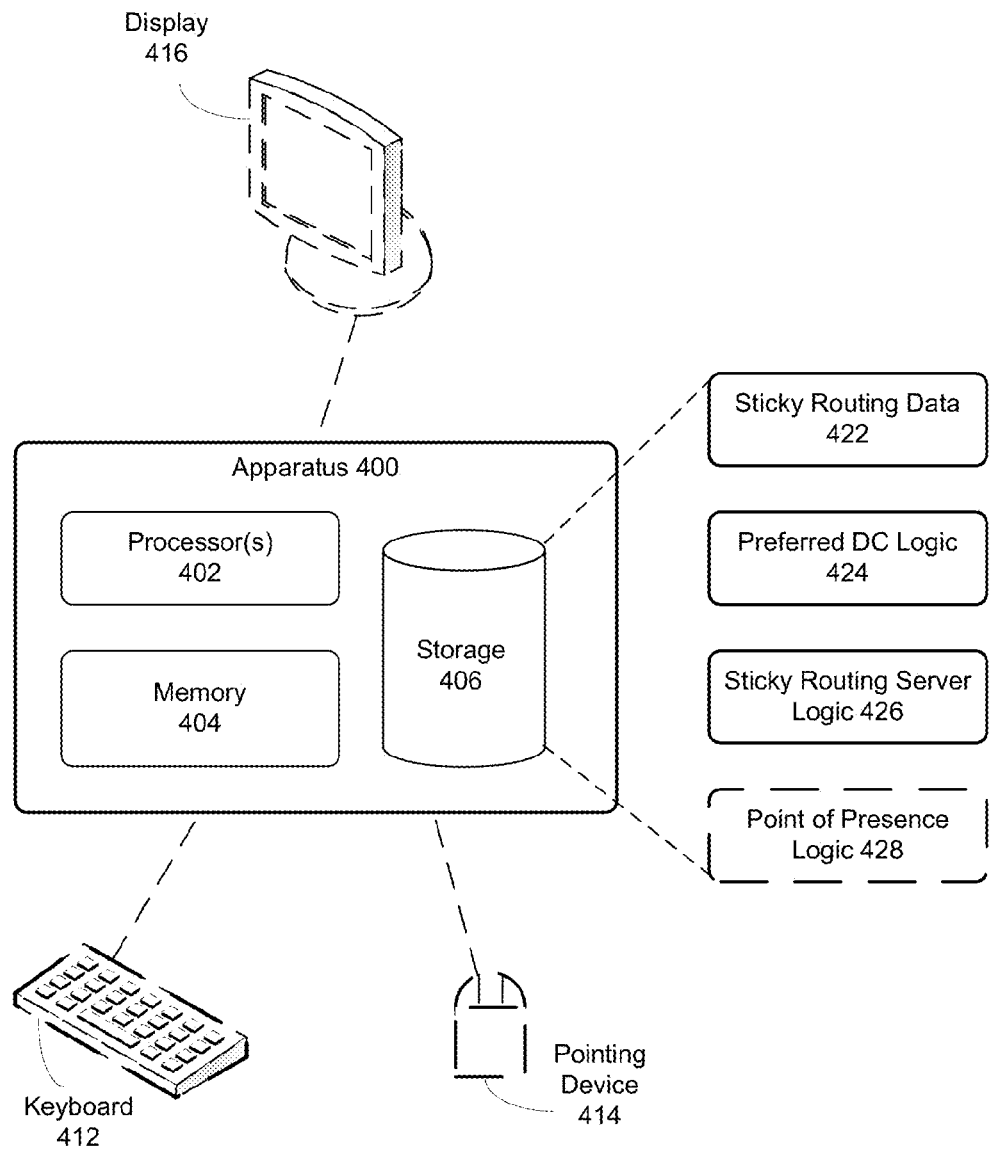
FIG. 4 is a block diagram of a sticky routing apparatus, in accordance with some embodiments.

FIG. 4 is a block diagram of an apparatus for performing or supporting sticky routing, according to some embodiments.

Apparatus 400 of FIG. 4 comprises processor(s) 402, memory 404 and storage 406, which may comprise one or more optical, solid-state and/or magnetic storage components. Storage 406 may be local or remote to the apparatus. Apparatus 400 may be coupled (permanently or transiently) to keyboard 412, pointing device 414 and display 416.

Storage 406 stores sticky routing data 422 for determining how or where to route user connections and service requests. As described previously, routing data 422 may be configured as one or more tables (or other structures) for identifying users' preferred data centers, current assignments (e.g., to buckets associated with particular data centers), version information (e.g., of users' routing data, of users' assigned buckets), timestamps of users' routing data and/or cookies, expiration dates, etc.

Storage 406 also stores logic that may be loaded into memory 404 for execution by processor(s) 402. Such logic includes preferred data center logic 424, sticky routing server logic 426, and optional point of presence logic 428. In other embodiments, these logic modules and/or other content may be combined or divided to aggregate or separate their functionality as desired. One apparatus operating as a point of presence and a second apparatus operating to operate as a sticky routing server may therefore be configured differently (e.g., with only the logic necessary for their roles).

Preferred data center logic 424 comprises processor-executable instructions for determining users' preferred data centers. In some implementations, logic 424 examines patterns of users' data traffic, network addresses from which and/or through which they connect, user attributes (e.g., location, residence), and/or other data, and determines which data center is most appropriate for them (e.g., the closest data center).

Sticky routing server logic 426 comprises processor-executable instructions for generating, maintaining and serving users' sticky routing data 422. Logic 426 may therefore assemble data 422, update it, and use it to identify (e.g., to points of presences and/or other entities) where to route a given user's service connections and requests. The sticky routing server logic keeps track of which data centers exist, their statuses (e.g., online, offline), which buckets are associated with which data centers (and the buckets' statuses), and so on, and updates the generation numbers of users' sticky routing data and of data center buckets, etc.

Point of presence logic 428 comprises processor-executable instructions for receiving users' connection attempts and service requests, examining users' cookies (and delivers new ones), retrieving users' sticky routing data (i.e., from a sticky routing server), routing user connections and requests to their preferred data center (if available) or an alternative data center, etc.

In some embodiments of the invention, apparatus 400 performs most or all of the functions described in relation to sticky routing server 240a of FIG. 2. In some particular implementations, apparatus 400 may host multiple virtual computer servers performing the functions of some or all of the sticky routing servers 240 of FIG. 2.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of sticky routing of user connections to a distributed service comprising multiple data centers, the method comprising:
    for each of the multiple data centers, establishing multiple associated user buckets, wherein all service requests from all users in a given bucket are routed to the associated data center, and wherein each user bucket has only one of three states:
        online, wherein an online bucket is available to receive new users;
        offline, wherein users assigned to an offline bucket are expelled from the bucket; and
        closed, wherein a closed bucket is not available to receive new users and users assigned to a closed bucket are not expelled from the bucket;
    receiving a first service request from a first device operated by a first user;
    assigning the first user to a first user bucket that is online, wherein the first user bucket is associated with a first data center;
    storing first sticky routing data for the first user, wherein the first sticky routing data comprises:
        a member ID;
        an identifier of the first user bucket; and
        a generation of the first user bucket; and
    routing the first service request to the first data center.

2. The method of claim 1, further comprising:
    receiving a second service request from a second device operated by the first user;
    retrieving the first sticky routing data; and
    routing the second service request to the first data center.

3. The method of claim 2, wherein:
    routing the first service request comprises delivering a cookie comprising the sticky routing data to the first device; and
    routing the second service request comprises delivering the cookie to the second device.

4. The method of claim 1, further comprising:
    from the multiple data centers, determining a preferred data center for the first user;
    wherein the first sticky routing data further comprises the preferred data center.

5. The method of claim 1, wherein:
    a user expelled from an offline bucket is assigned to an online bucket when a next service request is received from a device operated by the user.

6. A non-transitory computer-readable medium storing instructions that, when executed by a processor, cause the processor to perform a method of method of sticky routing of user connections to a distributed service comprising multiple data centers, the method comprising:
    for each of the multiple data centers, establishing multiple associated user buckets, wherein all service requests from all users in a given bucket are routed to the associated data center, and wherein each user bucket has only one of three states:
        online, wherein an online bucket is available to receive new users;
        offline, wherein users assigned to an offline bucket are expelled from the bucket; and
        closed, wherein a closed bucket is not available to receive new users and users assigned to a closed bucket are not expelled from the bucket;
    receiving a first service request from a first device operated by a first user;
    assigning the first user to a first user bucket that is online, wherein the first user bucket is associated with a first data center;
    storing first sticky routing data for the first user, wherein the first sticky routing data comprises:
        a member ID;
        an identifier of the first user bucket; and
        a generation of the first user bucket; and
    routing the first service request to the first data center.

7. An apparatus for sticky routing of requests to a distributed service comprising multiple data centers, the apparatus comprising:
    one or more processors;
    sticky routing data for each of multiple users of the distributed service, wherein first sticky routing data of a first user comprises:
        a member ID of the first user;
        an identifier of a first bucket the first user is assigned to, wherein the first bucket is one of one or more buckets associated with a first data center and has only one of three states:
            online, wherein an online bucket is available to receive new users:
            offline, wherein users assigned to an offline bucket are expelled from the bucket; and
            closed, wherein a closed bucket is not available to receive new users and users assigned to a closed bucket are not expelled from the bucket;
        a generation of the bucket; and
        a generation of the first sticky routing data; and
    memory storing instructions that, when executed by the one or more processors, cause the apparatus to:
        in response to a first service request from a first device of the first user, generate the first sticky routing data for the first user;
        store the first sticky routing data; and
        cause service requests from a plurality of devices operated by the first user to be routed to the first data center and not any other data center of the multiple data centers.

8. The apparatus of claim 7, wherein generating the first sticky routing data comprises:
    from the member ID of the first user, identifying a preferred data center;

determining whether the preferred data center of the first user is online; and assigning the first user to a bucket that is online, wherein the assigned bucket is the first bucket.

9. The apparatus of claim 7, wherein causing service requests from a plurality of devices operated by the first user to be routed to the first data center and not any other data center of the multiple data centers comprises:

serving a common cookie to each of the plurality of devices, wherein the common cookie comprises at least a portion of the first sticky routing data.

10. A system, comprising:

multiple data centers, each data center including multiple computers, each computer comprising a processor and memory and hosting a common application;

multiple points of presence for routing application requests to the multiple data centers; and for each data center, one or more associated logical buckets, wherein each user of the application is assigned to one bucket, and all application requests received from devices operated by one user are routed to the data center associated with the one user's assigned bucket, and wherein each bucket has only one of three states:

online, wherein an online bucket is available to receive new users;

offline, wherein users assigned to an offline bucket are expelled from the bucket; and closed, wherein a closed bucket is not available to receive new users and users assigned to a closed bucket are not expelled from the bucket.

11. The system of claim 10, further comprising, for each user of the application, a cookie configured to identify:

the logical bucket to which the user is assigned;

a generation of the logical bucket; and a generation of the cookie.

12. The system of claim 11, wherein:

the logical bucket generation is modified when a status of the associated data center changes.

13. The system of claim 10, further comprising:

a data store that stores, for each user of the common application, sticky routing data comprising:

a member ID;

an identifier of a current logical bucket to which the user is assigned;

a generation of the current logical bucket;

a generation of the user's sticky routing data; and a time of issue of the user's sticky routing data.

14. The system of claim 10, wherein the common application is a professional social networking service.

15. The system of claim 10, further comprising:

a sticky routing server comprising:

a processor; and memory storing instructions that, when executed by the processor, cause the sticky routing server to:

receive from a point of presence a request for sticky routing data for a first user;

determine whether the requested sticky routing data exists;

generate the requested sticky routing data if the requested sticky routing data does not exist, said generation including assigning the first user to a bucket that is online; and transmitting the requested sticky routing data to the point of presence.

16. The system of claim 15, wherein determining whether the requested sticky routing data exists comprises:

retrieving the requested sticky routing data from a sticky routing data store;

determining whether a bucket to which the first user is assigned is offline or is closed; and if the bucket to which the first user is assigned is offline or is closed, re-assigning the first user to a bucket that is online.

17. The apparatus of claim 7, wherein the memory further stores instructions that, when executed by the one or more processors, cause the apparatus to:

determine that the first bucket has changed to an offline or closed state; and re-assign the first user to a bucket that is online.

18. The apparatus of claim 7, wherein the distributed service is a professional networking service.

19. The method of claim 1, wherein:

the first service request is part of a first user session with the distributed service; and the first sticky routing data persists across multiple user sessions with the distributed service.

20. The method of claim 1, wherein the distributed service is a professional networking service.

* * * * *